(12) United States Patent
Abohammdan et al.

(10) Patent No.: US 10,442,450 B2
(45) Date of Patent: Oct. 15, 2019

(54) DOLLY EDGE SUPPORT DEVICE

(71) Applicant: Walmart Apollo, LLC, Bentonville, AR (US)

(72) Inventors: Tawfeek Abohammdan, Rogers, AR (US); Jeffrey D. Green, Bentonville, AR (US); Dorita S. Mericle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/130,257

(22) Filed: Sep. 13, 2018

(65) Prior Publication Data

US 2019/0126964 A1 May 2, 2019

Related U.S. Application Data

(60) Provisional application No. 62/577,508, filed on Oct. 26, 2017.

(51) Int. Cl.
*B62B 3/04* (2006.01)
*B62B 5/00* (2006.01)

(52) U.S. Cl.
CPC .............. *B62B 3/04* (2013.01); *B62B 5/0006* (2013.01); *B62B 2202/12* (2013.01); *B62B 2203/60* (2013.01)

(58) Field of Classification Search
CPC ...................................................... B62B 3/04
See application file for complete search history.

(56) References Cited

U.S. PATENT DOCUMENTS

| 2,860,805 | A | 11/1958 | Katterjohn | |
|---|---|---|---|---|
| 6,409,193 | B2 * | 6/2002 | Bernard | B60R 3/002 280/163 |
| 7,059,617 | B1 | 6/2006 | Verna | |
| 9,668,437 | B2 * | 6/2017 | McCarthy | A01G 22/00 |
| 2002/0153682 | A1 | 10/2002 | Gruber | |
| 2017/0203874 | A1 | 7/2017 | Dimer | |

FOREIGN PATENT DOCUMENTS

WO  2016/193538 A1  12/2016

OTHER PUBLICATIONS

Tugger train pallet cart 50 x 41 inch | Modular industrial carts for material handling | FlexQube®, https://www.flexqube.com/sl/solutions/flatbedspalletcontainer-carts/tugger-train-pallet-cart-50-x-41-inch, last viewed Aug. 17, 2017.
(Continued)

*Primary Examiner* — James A Shriver, II
*Assistant Examiner* — James J Triggs
(74) *Attorney, Agent, or Firm* — McCarter & English, LLP; David R. Burns

(57) ABSTRACT

Example edge support devices for a dolly are described. The edge support devices include a body including first and second body sections angled relative to each other, a first engagement assembly extending from a bottom surface of the first body section, and a second engagement assembly extending from a bottom surface of the second body section. The first and second engagement assemblies each include a central protrusion and pairs of side protrusions configured to be inserted into openings in the supporting surface of the dolly. The pairs of side protrusions of the first and second engagement assemblies engage the respective openings of the dolly to detachably couple the body of the edge support devices to the dolly.

17 Claims, 8 Drawing Sheets

(56) References Cited

OTHER PUBLICATIONS

Pallet Guide Wheel Attachment Left | Modular industrial carts for material handling | FlexQube®, https://www.flexqube.com/sl/parts/pallet-guides/pallet-guide-wheel-attachment-left-4, last viewed Aug. 17, 2017.
Wheel Box Cover Plate Left | Modular industrial carts for material handling | FlexQube®, https://www.flexqube.com/sl/parts/pallet-guides/wheel-box-cover-plate-left, Aug. 17, 2018.
Rack Cart 2450 x 1260 mm | Modular industrial carts for material handling | FlexQube®, https://www.flexqube.com/sl/solutions/racks-fixtures/rack-cart-2450-x-1260-mm, last viewed Aug. 17, 2017.
Large Tugger Cart—Low Rider 63 x 48 Inch | Modular industrial carts for material handling | FlexQube®, https://www.flexqube.com/sl/solutions/flatbedspalletcontainer-carts/large-tugger-cart—low-rider-63-x-48-inch-1, last viewed Aug. 17, 2017.
Guide Plate 63 x 48 inch Right | Modular industrial carts for material handling | FlexQube®, https://www.flexqube.com/sl/parts/pallet-guides/guide-plate-63-x-48-inch-right, last viewed Aug. 17, 2017.
Pallet Guide Corner Plate—Large | Modular industrial carts for material handling | FlexQube®, https://www.flexqube.com/sl/parts/pallet-guides/pallet-guide-corner-plate—large-1, last viewed Aug. 17, 2017.
1000Kg Pallet Dolly Pallet Dollies, https://www.theworkplacedepot.co.uk/1000kg-pallet-dolly, last viewed Aug. 17, 2017.
Corner Plate High Borders | Modular industrial carts for material handling | FlexQube®, https://www.flexqube.com/sl/parts/pallet-guides/corner-plate-high-borders, last viewed Aug. 17, 2017.
EUR-Pallet Tugger Cart with 6 Casters and High Edges | Modular industrial carts for material handling | FlexQube®, https://www.flexqube.com/sl/solutions/flatbedspalletcontainer-carts/eur-pallet-tugger-cart-with-6-casters-and-high-edges-1, last viewed Aug. 17, 2017.
Pallet Guide Corner Plate | Modular industrial carts for material handling | FlexQube®, https://www.flexqube.com/sl/parts/pallet-guides/pallet-guide-corner-plate-1, last viewed Aug. 17, 2017.
Pallet Cart High | Modular industrial carts for material handling | FlexQube®, https://www.flexqube.com/sl/solutions/flatbedspalletcontainer-carts/pallet-cart-high, last viewed Aug. 17, 2017.
Right Angle Corner Plate | Modular industrial carts for material handling | FlexQube®, https://www.flexqube.com/sl/parts/pallet-guides/right-angle-corner-plate, last viewed Aug. 17, 2017.
Handling cart / transport / metal / for Euro containers—521-6000-02—LKE GmbH—Experts in Material Handling, Direct Industry, http://www.directindustry.com/prod/lke-gmbh-experts-material-handling/product-39074-555043.html, last viewed Aug. 17, 2017.
International Search Report and Written Opinion for Application No. PCT/US2018/050821, dated Dec. 11, 2018, 12 pages.

\* cited by examiner

DOLLY EDGE SUPPORT DEVICE

CROSS-REFERENCE TO RELATED APPLICATIONS

This application claims the benefit of commonly assigned U.S. Provisional Patent Application No. 62/577,508, which was filed on Oct. 26, 2017. The entire content of the foregoing provisional patent application is incorporated herein by reference.

BACKGROUND

Dollies are used in a variety of environments to transport containers (e.g., boxes) between locations of interest. Some traditional dollies include spring-actuated supports mounted to the supporting surface of the dolly to prevent the containers from sliding off the dolly. However, accidental placement of a container on top of the spring-actuated support retracts the support, allowing the container to slide off the dolly resulting in potential damage or loss of items stored within the container.

SUMMARY

Exemplary embodiments of the present disclosure are directed to an edge support device for a dolly that provides support at each of the corners of the dolly, preventing undesired sliding or movement of the containers on the supporting surface of the dolly. The edge support device includes a body with first and second body sections angled relative to each other, thereby providing two points of contact at each corner of the dolly. Each body section includes a dedicated engagement assembly configured to be inserted into the openings of the dolly. The engagement assemblies rigidly couple the edge support device to the supporting surface of the dolly and prevent undesired disengagement or retraction of the edge support device during loading, unloading and movement of the dolly.

In accordance with embodiments of the present disclosure, an exemplary edge support device for a dolly is provided. The dolly includes a supporting surface and openings in the supporting surface. The edge support device includes a body, a first engagement assembly, and a second engagement assembly. The body includes a first body section and a second body section angled relative to the first body section. Each of the first and second body sections includes a top surface and a bottom surface. The first engagement assembly extends from the bottom surface of the first body section. The first engagement assembly includes a first central protrusion and a first pair of side protrusions disposed on opposing sides of the first central protrusion configured to be inserted into one of the openings of the dolly. The second engagement assembly extends from the bottom surface of the second body section. The second engagement assembly includes a second central protrusion and a second pair of side protrusions disposed on opposing sides of the second central protrusion configured to be inserted into one of the openings of the dolly. The first and second pairs of side protrusions of the first and second engagement assemblies engage the respective openings of the dolly to detachably couple the body to the dolly.

In certain embodiments, the second body section is angled relative to the first body section by approximately 90°. In certain embodiments, the first and second body sections are angled relative to each other to define a substantially L-shaped configuration. The first and second body sections extend along a first plane. The first and second engagement assemblies extend perpendicularly away from the first plane. The first engagement assembly extends parallel to the first body section in a second plane and the second engagement assembly extends parallel to the second body section in a third plane.

The first and second central protrusions are rigid, fixed structures (e.g., non-spring-loaded) extending from the bottom surface of the respective first and second body sections. A length of the side protrusions can be dimensioned greater than a length of each of the respective first and second central protrusions. Each of the side protrusions can be spaced from the respective first and second central protrusions. Each of the side protrusions is configured to engage with the respective openings of the dolly via a snap fit. Each of the side protrusions includes an elongated section connected to the bottom surface of the respective first and second body sections at one end. Each of the side protrusions includes a hook-shaped endpoint at an opposing end of the elongated section. The hook-shaped endpoints face away from the respective first and second central protrusions.

In accordance with embodiments of the present disclosure, an exemplary dolly system is provided. The dolly system includes a dolly and an edge support device. The dolly includes a supporting surface and openings in the supporting surface. The edge support device includes a body, a first engagement assembly and a second engagement assembly. The body includes a first body section and a second body section angled relative to the first body section. Each of the first and second body sections includes a top surface and a bottom surface. The first engagement assembly extends from the bottom surface of the first body section. The first engagement assembly includes a first central protrusion and a first pair of side protrusions disposed on opposing sides of the first central protrusion configured to be inserted into one of the openings of the dolly. The second engagement assembly extends from the bottom surface of the second body section. The second engagement assembly includes a second central protrusion and a second pair of side protrusions disposed on opposing sides of the second central protrusion configured to be inserted into one of the openings of the dolly. The first and second pairs of side protrusions of the first and second engagement assemblies engage the respective openings of the dolly to detachably couple the edge support device to the dolly.

In certain embodiments, the second body section is angled relative to the first body section by approximately 90°. In certain embodiments, the first and second body sections are angled relative to each other to define a substantially L-shaped configuration. The first and second central protrusions are rigid, fixed structures extending from the bottom surface of the respective first and second body sections. The openings in the supporting surface of the dolly include a central partial opening and two full openings on opposing sides of the central partial opening. The two full openings extend entirely through the dolly. During engagement of the first and second pairs of side protrusions of the first and second engagement assemblies with the respective openings of the dolly, the respective first and second central protrusions abut a bottom surface of the central partial opening and the side protrusions pass into and engage the respective two full openings.

In accordance with embodiments of the present disclosure, an exemplary edge support device for a dolly is provided. The dolly includes a supporting surface and an opening in the supporting surface. The edge support device includes a body and an engagement assembly. The body includes a top surface and a bottom surface. The engagement assembly extends from the bottom surface of the body. The engagement assembly including a central protrusion and a pair of side protrusions disposed on opposing sides of the central protrusion. The central protrusion is a rigid structure extending from the bottom surface of the body. The engagement assembly is configured to be inserted into and engaged with the opening of the dolly to detachably couple the body to the dolly.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed dolly edge support devices, reference is made to the accompanying figures, wherein.

DETAILED DESCRIPTION

Figure 1:
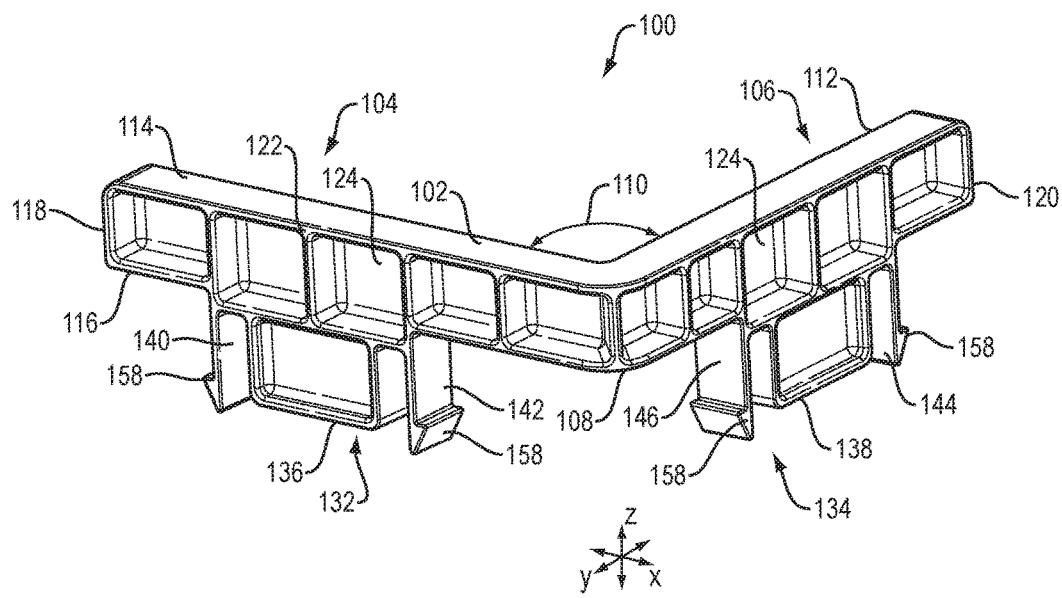
FIG. 1 is a perspective view of an exemplary edge support device of the present disclosure.

Exemplary embodiments of the present disclosure provide edge support devices for a dolly that effectively maintain the position of containers on the supporting surface of the dolly. The edge support devices include one or more engagement assemblies that rigidly and selectively couple the body of the edge support device to the dolly. In certain embodiments, the edge support device defines a substantially L-shaped configuration such that positioning the edge support device at a corner of the dolly provides a two-point contact for preventing movement of the container off the supporting surface, e.g., in two perpendicular directions. In certain embodiments, the edge support device defines a substantially linear configuration such that positioning the edge support device on the dolly provides a single-point contact for preventing movement of the container off the supporting surface, e.g., in a single direction. Coupling multiple edge support devices along the perimeter of the supporting surface ensures the position of the container as the dolly is used.

FIGS. 1-4 are perspective, side, front and top views of an exemplary edge support device 100 (hereafter "device 100") configured to be detachably coupled to the supporting surface of a dolly. The device 100 includes a body 102 with a first body section 104 and a second body section 106. The first and second body sections 104, 106 are connected to each other at a substantially central corner or joint 108, and are angled relative to each other. In certain embodiments, the angle 110 between the first and second body sections 104, 106 is substantially 90°, defining an L-shaped configuration. For example, the first body section 104 has a length that extends along the x-axis and the second body section 106 has a length that extends along the y-axis. The angled relationship between the first and second body sections 104, 106 creates a two-point contact between the inner surfaces 112 of the body 102 and a container disposed on the supporting surface of the dolly. For example, detachably coupling the device of FIG. 1 at a corner of the dolly provides support to the container at both inner surfaces 112 in substantially perpendicular directions.

The body 102 includes top and bottom surfaces 114, 116 extending parallel to each other and extending along the same respective planes between the first and second body sections 104, 106. Particularly, the first and second body sections 104, 106 share one horizontal plane along which the top surface 114 extends, and also share a parallel plane along which the bottom surface 116 extends. The first and second body sections 104, 106 therefore extend along the same general plane (e.g., a horizontal plane). The first and second body sections 104, 106 each include end surfaces 118, 120 that can be substantially perpendicular to the top and bottom surfaces 114, 116.

Figure 4:
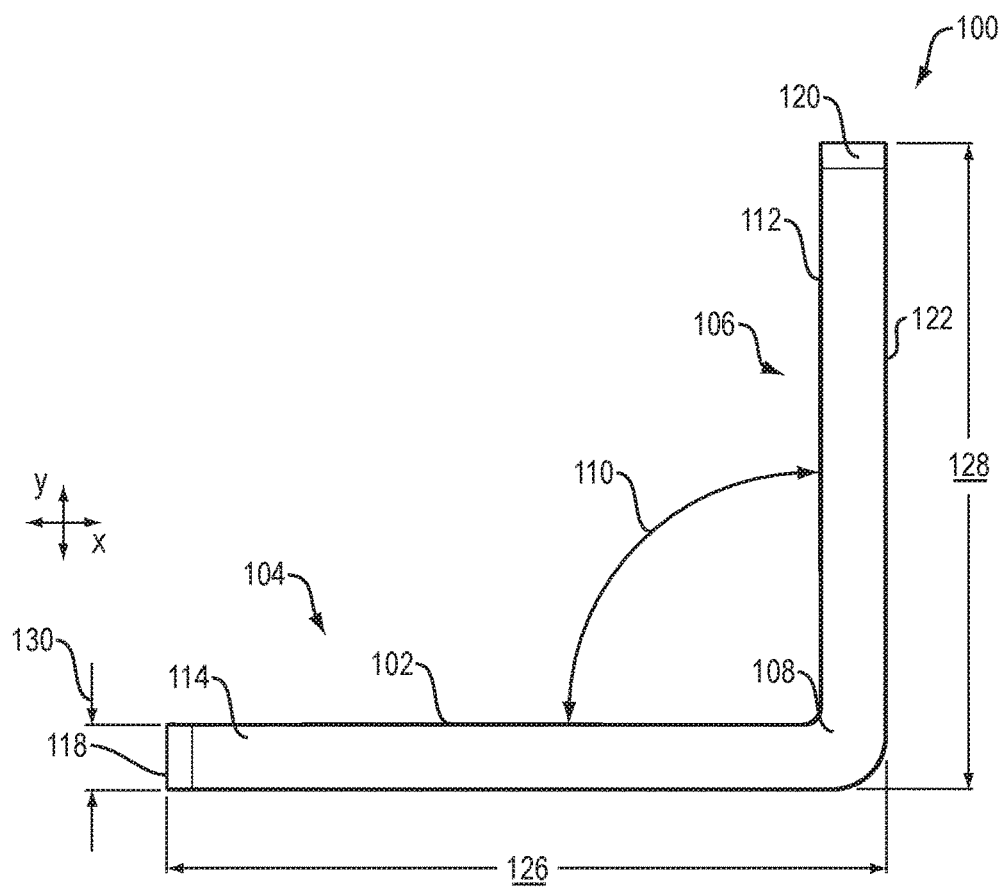
FIG. 4 is a top view of an exemplary edge support device of the present disclosure.

In certain embodiments, the outer surfaces 122 of the first and second body sections 104, 106 can include one or more cavities 124 (e.g., substantially square cavities) formed therein, while the inner surfaces 112 are substantially planar. The cavities 124 can reduce the overall weight of the device 100 and cost of manufacturing the device 100 (due to a reduction in materials), while maintaining the structural stability of the device 100. In certain embodiments, as shown in FIG. 4, the length 126 of the first body section 104 can be dimensioned greater than the length 128 of the second body portion 106. Such difference can accommodate a greater length 126 for a side of the dolly that needs more support or tends to receive greater forces from movement of the container on the supporting surface. In certain embodiments, the length 128 can be greater than the length 126, or the lengths 126, 128 can be dimensioned substantially equally/similarly. The width 130 of the first and second body sections 104, 106 can be dimensioned substantially equally/similarly.

The device 100 includes a first engagement assembly 132 extending from the bottom surface 116 of the first body portion 104, and includes a second engagement assembly 134 extending from the bottom surface 116 of the second body portion 106. The first and second engagement assemblies 132, 134 extend substantially perpendicularly away from the plane defined by the bottom surface 116. The first engagement assembly 132 extends substantially parallel to the first body section 104, and the second engagement assembly 134 extends substantially parallel to the second body section 106. The first and second engagement assemblies 132 can extend along planes that are perpendicular to the plane defined by the bottom surface 116. The first engagement assembly 132 can extend along a plane that is perpendicular to the plane along which the second engagement assembly extends.

The first engagement assembly 132 is spaced from the end surface 118 and the joint 108. The second engagement assembly 134 is similarly spaced from the end surface 120 and the joint 108. In certain embodiments, the first and second engagement assemblies 132, 134 can be disposed at a substantially central location between the respective end surfaces 118, 120 and the joint 108. In certain embodiments, the first and/or second engagement assemblies 132, 134 can be disposed closer to the respective end surface 118, 120 and/or the joint 108.

Figure 2:
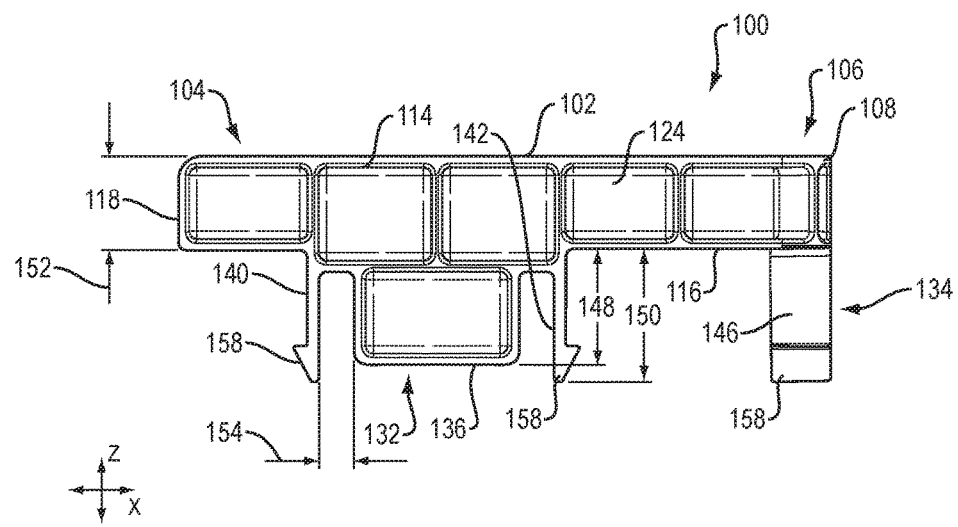
FIG. 2 is a side view of an exemplary edge support device of the present disclosure.

Each of the first and second engagement assemblies 132, 134 includes a central protrusion 136, 138 and a pair of side protrusions 140-146 disposed on opposing sides of the central protrusion 136, 138. As will be discussed in greater detail below, the engagement assemblies 132, 134 are configured to be inserted into openings in the supporting surface of the dolly, with the side protrusions 140-146 interlocking with the openings to detachably couple the device 100 to the dolly. As shown in FIG. 2, the length 148 of the central protrusion 136, 138 measured along the z-axis from the bottom surface 116 can be dimensioned smaller than the length 150 of the side protrusions 140-146, thereby allowing the side protrusions 140-146 to extend further into the openings in the supporting surface of the dolly for detachable engagement with the dolly. In certain embodiments, the length or height 152 of the first and second body sections 104, 106 measured along the z-axis can be dimensioned to be smaller than the lengths 148, 150.

Although the material of fabrication allows for the protrusions 140-146 to bend or flex relative to the bottom surface 116 and the central protrusion 136, 138, the overall structure of the engagement assemblies 132, 134 is rigid (e.g., not collapsible into a smaller shape). Particularly, the side protrusions 140-146 are spaced from the central protrusion 136, 138 by a lateral distance 154. Such spacing allows for the side protrusions 140-146 to flex or deflect inwardly toward the central protrusion 136, 138 during insertion of the engagement assemblies 132, 134 into the openings in the supporting surface of the dolly, with the side protrusions 140-146 snapping back or returning to a normal (e.g., substantially parallel) position upon reaching a certain depth in the opening and interlocking with a bottom edge of the dolly. The flexibility of the side protrusions 140-146 therefore allows for a snap fit engagement with the dolly.

Figure 3:
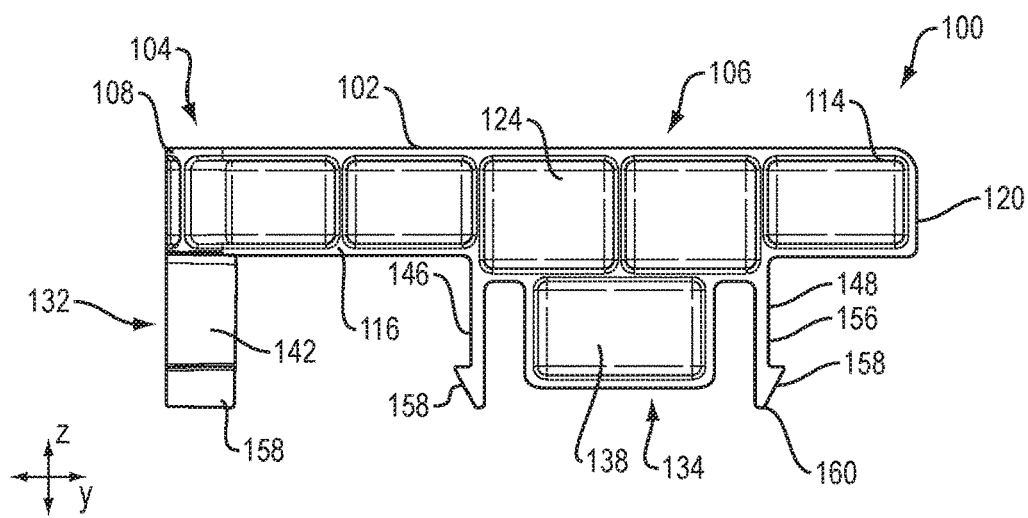
FIG. 3 is a front view of an exemplary edge support device of the present disclosure.

As shown in FIG. 3, each of the side protrusions 140-146 includes an elongated section 156 connected at one end to the bottom surface 116 of the respective first and second body sections 104, 106. At the opposing end, each of the side protrusions 140-146 includes an endpoint 158 (e.g., a hook-shaped endpoint) terminating at a tapered end 160. The inner surface of the elongated section 156 (e.g., the surface facing the central protrusion 136, 138) defines a substantially planar surface that is parallel to the side of the central protrusion 136, 138. The outer surface of the elongated section 156 includes the endpoint 158 extending therefrom such that the hook-shaped endpoint 156 faces away from the central protrusion 136, 138.

Figure 5:
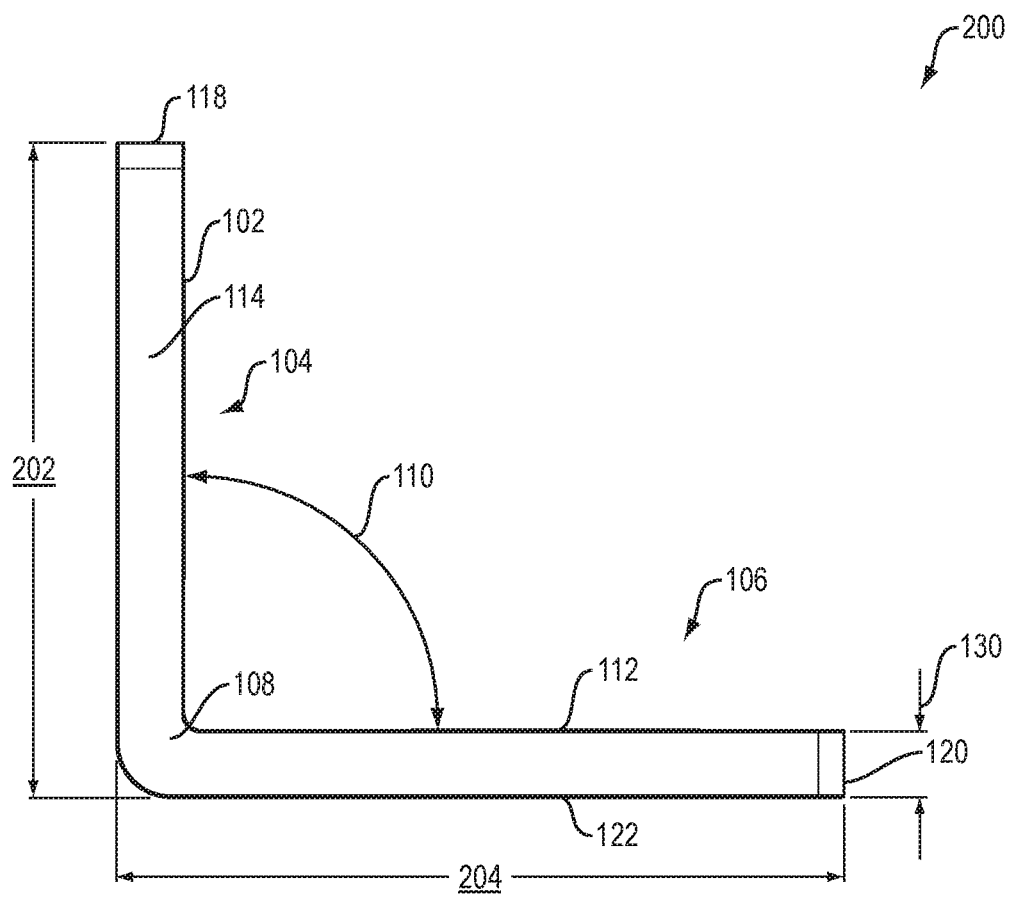
FIG. 5 is a top view of an exemplary edge support device of the present disclosure.

FIG. 5 is a top view of an exemplary edge support device 200 (hereinafter "device 200") of the present disclosure. The device 200 can be substantially similar in structure and function to the device 100, except for the distinctions noted herein. Therefore, like reference numbers are used to refer to like structures. Particularly, the device 200 includes a first body section 104 having a length 202 that is measured along the x-axis and is dimensioned to be shorter than a length 204 of the second body section 106 measured along the y-axis.

Figure 6:
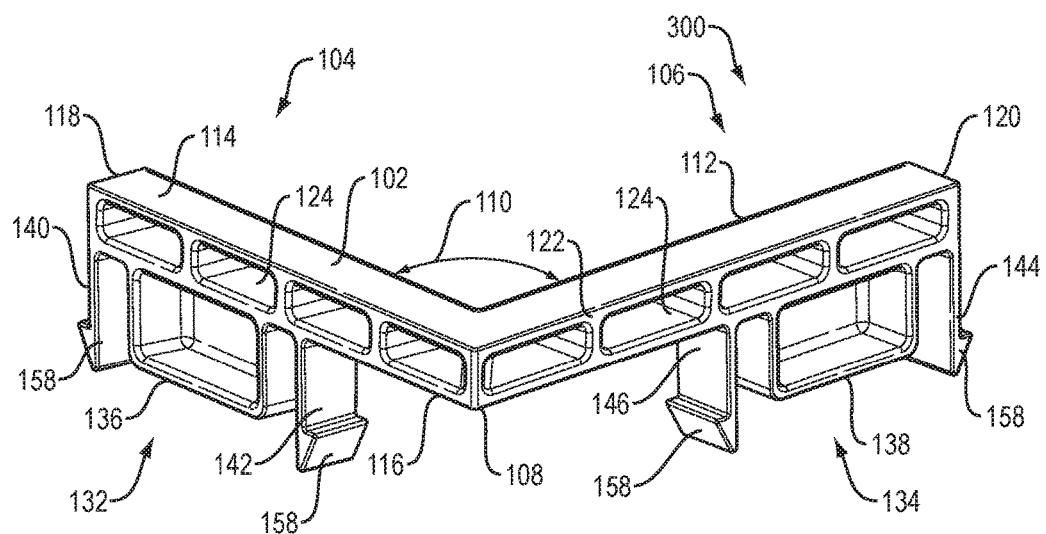
FIG. 6 is a perspective view of an exemplary edge support device of the present disclosure.

FIG. 6 is a perspective view of an exemplary edge support device 300 (hereinafter "device 300") of the present disclosure. The device 300 can be substantially similar in structure and function to the device 100, 200, except for the distinctions noted herein. Therefore, like reference numbers are used to refer to like structures. Particularly, rather than being spaced from the end surfaces 118, 120, the first and second engagement assemblies 132, 134 can be substantially aligned with the respective end surfaces 118, 120. Thus, the first engagement assembly 132 is spaced from the joint 108 and aligned with the end surface 118, and the second engagement assembly 132 is spaced from the joint 108 and aligned with the end surface 120. In certain embodiments, the cavities 124 formed in the body 102 can be elongated or oval in shape.

Figure 7:
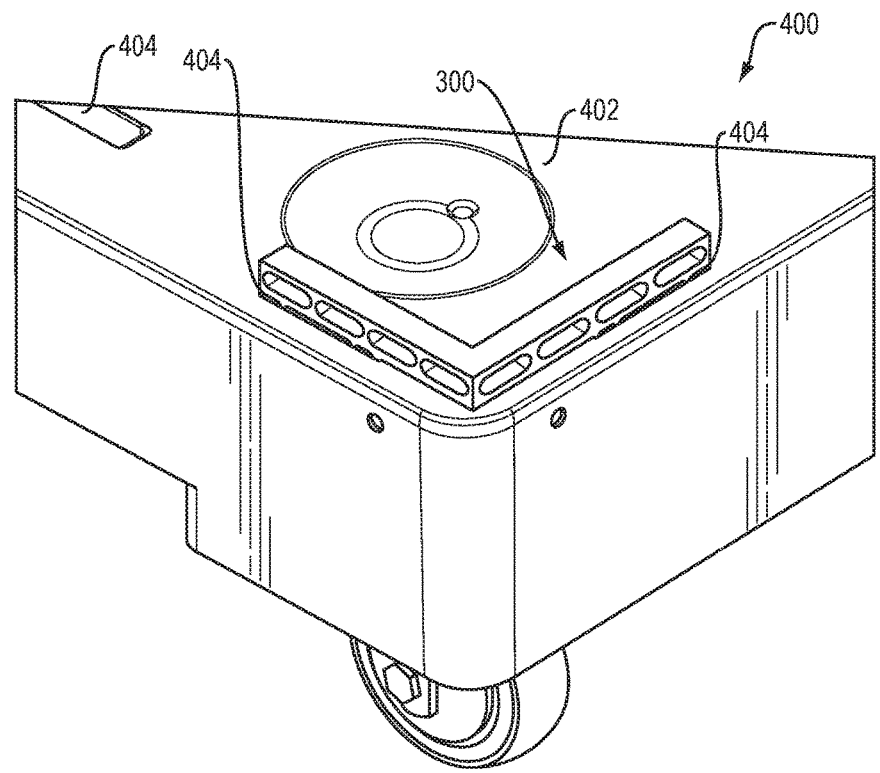
FIG. 7 is a perspective view of an exemplary edge support device of the present disclosure coupled to a supporting surface of a dolly.

FIG. 7 is a perspective view of the device 300 detachably coupled to a supporting surface 402 of a dolly 400. The supporting surface 402 can be substantially planar or flat, and includes a plurality of elongated openings 404 formed therein. The openings 404 can include partial openings that extend only a partial distance through the thickness of the dolly 400, and full openings that extend through the entire thickness of the dolly 400. As an example, FIG. 8 provides a diagrammatic cross-sectional view of an opening 404.

Figure 8:
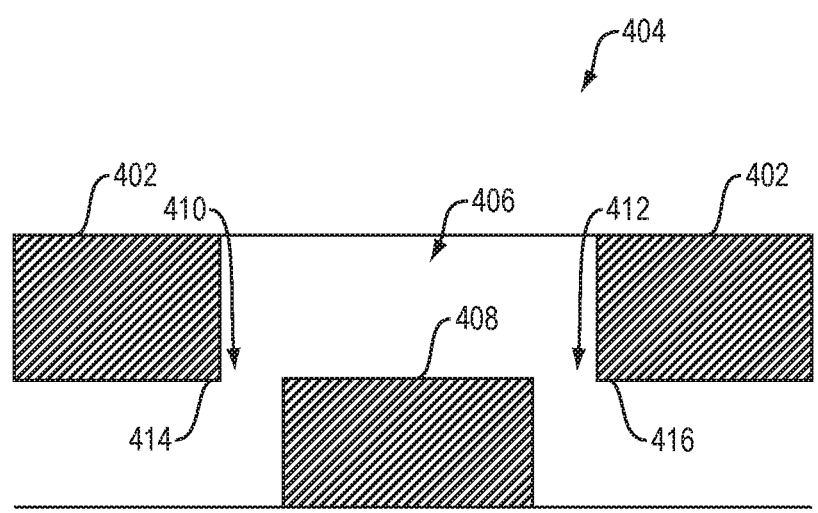
FIG. 8 is a diagrammatic cross-sectional view of an exemplary opening in a supporting surface of a dolly.

Referring to FIG. 8, each opening 404 includes a central partial opening 406 that extends through the supporting surface 402 and up to bottom abutment surface 408 of the dolly 400. Each opening 404 further includes two full openings 410, 412 on opposing sides of the central partial opening 406. The full openings 410, 412 extend around the sides of the bottom abutment surface 408 and below the bottom edges 414, 416 located on the opposing side of the supporting surface 402.

Referring to FIGS. 6-8, during engagement of the device 300 with the dolly 400, the first and second engagement assemblies 132, 134 are inserted into respective openings 404 in the supporting surface 402. The central protrusions 136, 138 pass through the central partial opening 406 and abut the top of the bottom abutment surface 408. The side protrusions 140-146 pass into and through the full openings 410, 412 and detachably engage or snap fit with the bottom edges 414, 416. Particularly, as the engagement assemblies 132, 134 are inserted into the respective openings 404, the side protrusions 140-146 are bent inwardly toward the respective central protrusions 136, 138.

When the edge of the endpoint 158 passes into the full opening 410, 412 beyond the bottom edges 414, 416, the side protrusions 140-146 snap outwardly away from the respective central protrusions 136, 138 and the endpoints 158 snap around and engage with the bottom edges 414, 416. Engagement of the endpoints 158 with the bottom edges 414, 416 and abutment of the central protrusion 136, 138 against the abutment surface 408 rigidly couples the device 300 to the supporting surface 402 and maintains the position of the device 300 during forces exerted on the device 300 from containers moving on the supporting surface 402. During engagement of the endpoints 158 with the bottom edges 414, 416, the bottom surface 116 of the device 300 abuts the supporting surface 402, providing additional stability to the assembly.

Figure 9:
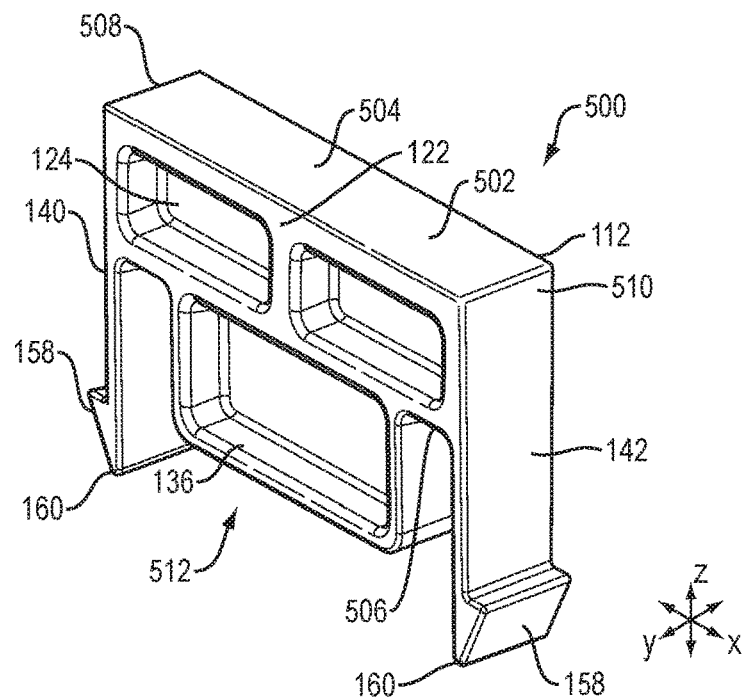
FIG. 9 is a perspective view of an exemplary edge support device of the present disclosure.
Figure 10:
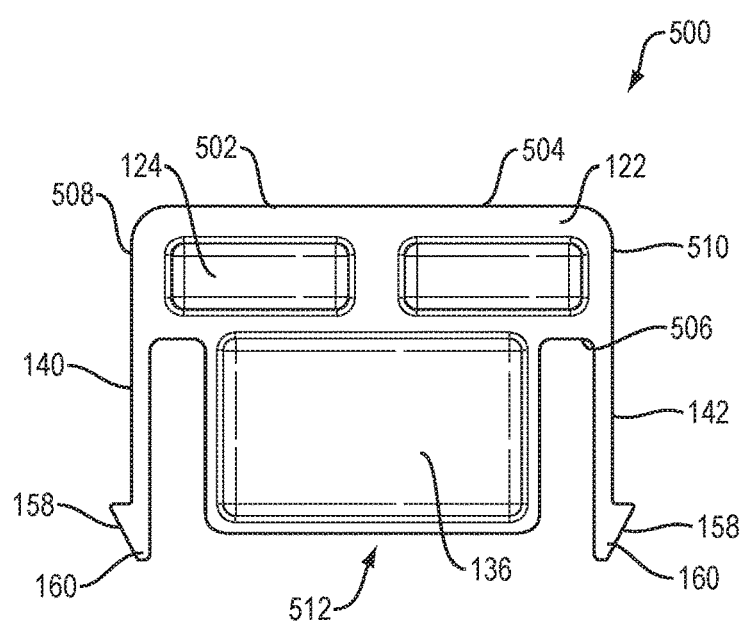
FIG. 10 is a front view of an exemplary edge support device of the present disclosure.

FIGS. 9 and 10 are perspective and front views of an exemplary edge support device 500 (hereinafter "device 500") of the present disclosure. The device 500 includes certain features that are substantially similar in structure and function to the device 100, except for the distinctions noted herein. Therefore, like reference numbers are used to refer to like structures. Particularly, rather than defining an L-shaped configuration with two angled body sections, the device 500 includes a single body section 502 extending linearly along a single horizontal plane (e.g., along only the x-axis). The body section 502 includes a top surface 504, a bottom surface 506 and end surfaces 508, 510 on opposing sides of the body section 502.

The device 500 includes a single engagement assembly 512 extending from the bottom surface 506. The engagement assembly 512 is substantially similar to the engagement assemblies 132, 134 discussed above. The device 500 can be engaged with an opening 404 in the supporting surface 402 of the dolly 400 such that the device 500 rigidly extends from the supporting surface 402. By defining a planar or linear body section 502, the device 500 provides a single point of contact for containers on the supporting surface 402. In particular, the device 500 generally prevents movement of the containers in a single direction (e.g., along the y-axis). Multiple devices 500 can be individually coupled along the perimeter of the dolly 400 to prevent the container from sliding off the supporting surface 402 during use of the dolly 400.

Figure 11:
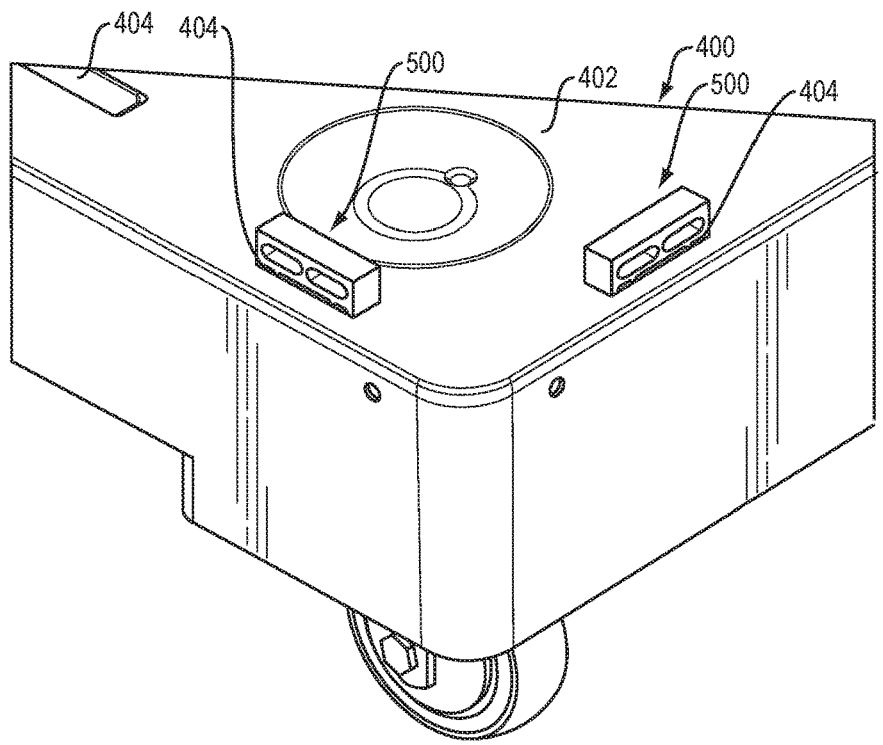
FIG. 11 is a perspective view of an exemplary edge support device of the present disclosure coupled to a supporting surface of a dolly.

As an example, FIG. 11 shows two devices 500 individually coupled with the openings 404 of the dolly 400. Rather than engaging an L-shaped device 100, 200, 300 with both openings 404 at the corner of the dolly 400, two individual devices 500 can be coupled at the corner of the dolly 400 to separately provide two points of contact. Thus, two devices 500 can be used to prevent containers from sliding off the supporting surface 402 at the corner of the dolly 400. The rigid structure of the devices discussed herein ensures that sufficient support is provided to withstand forces of containers sliding on the supporting surface 402, and further ensures that placement of a container on top of the device will not retract or lower the device into the opening 404 of the dolly 400.

Figure 12:
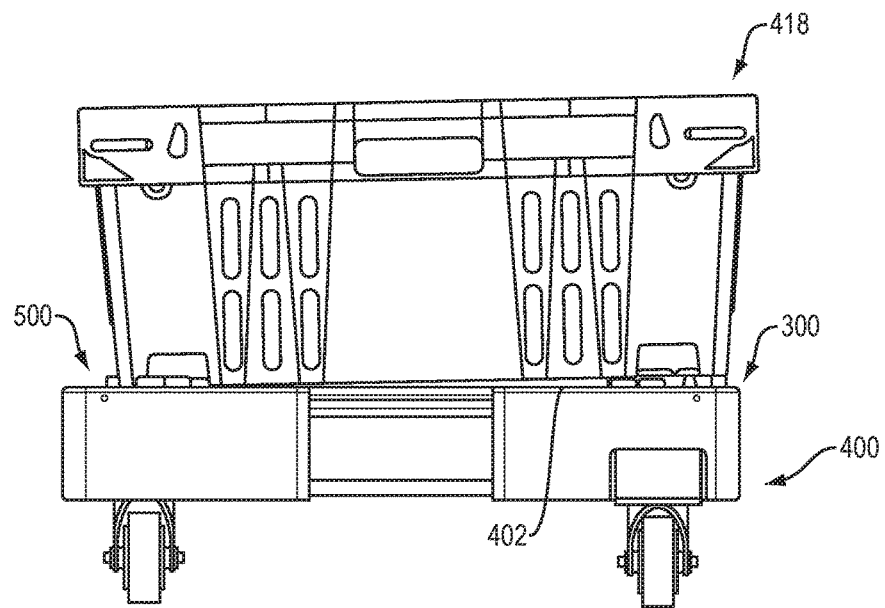
FIG. 12 is a side view of exemplary edge support devices of the present disclosure coupled to a supporting surface of a dolly.

FIG. 12 shows a side view of a container 418 (e.g., a basket) disposed on the dolly 400. Device 300 is used at the rightmost corner of the dolly 400 to provide two points of contact with the container 418, while two individual devices 500 are used at the leftmost corner of the dolly 400 to separately provide points of contact with the container 418. Both corners of the dolly 400 therefore include structural components that maintain the position of the container 418 on the supporting surface 402.

Figure 13:
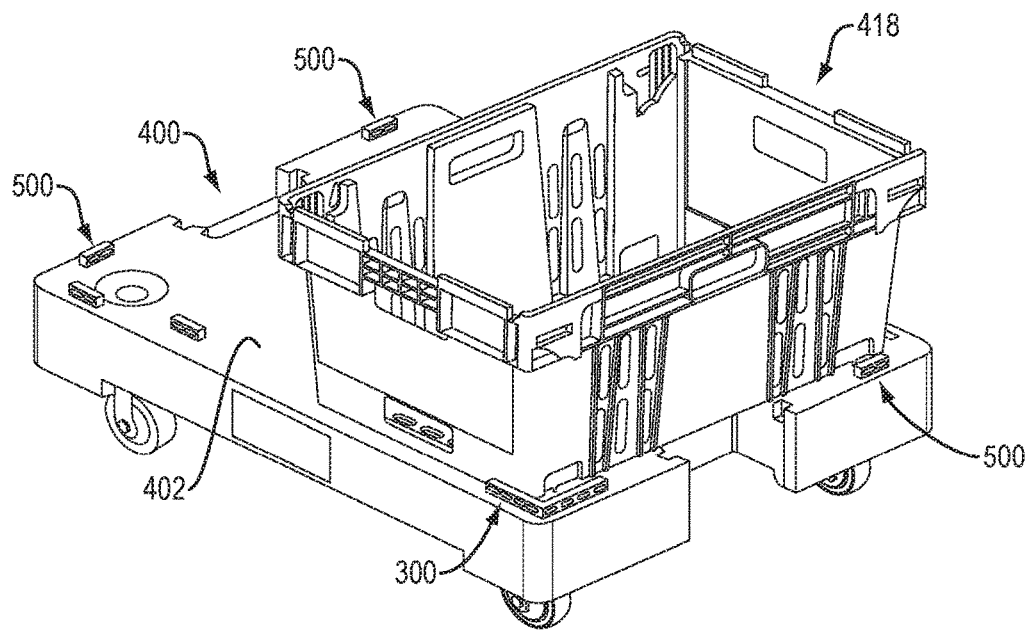
FIG. 13 is a perspective view of exemplary edge support devices of the present disclosure coupled to a supporting surface of a dolly.
Figure 14:
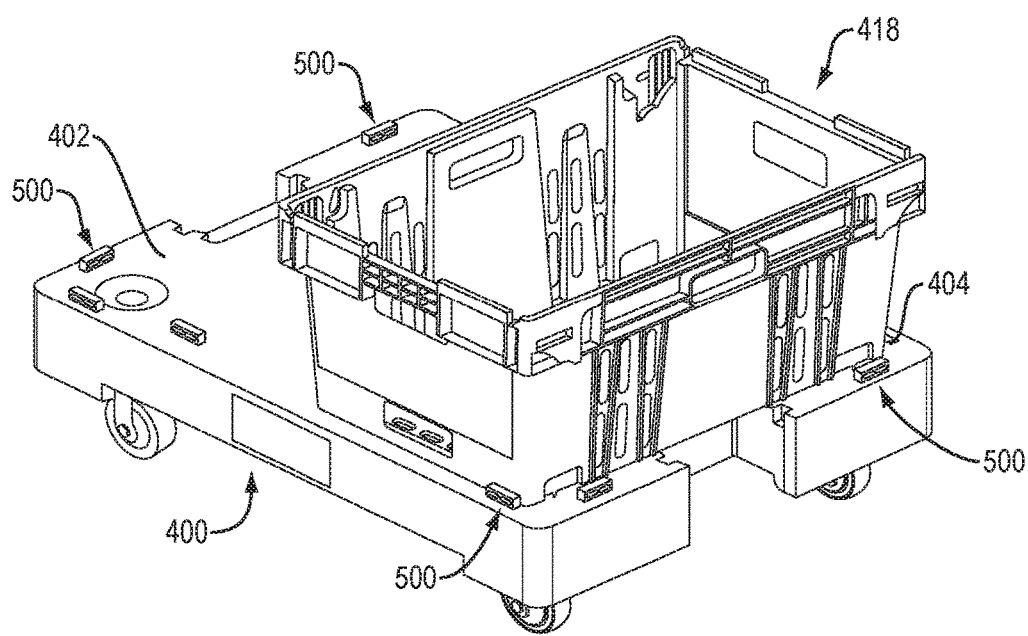
FIG. 14 is a perspective view of exemplary edge support devices of the present disclosure coupled to a supporting surface of a dolly.

As noted above and shown in FIG. 12, placement of the container 418 on the device 300 does not retract or lower the device into the opening 404 of the dolly 400. Instead, the rigid structure of the device 300 and the rigid coupling of the device 300 with the dolly 400 ensures that the device 300 maintains its structural stability and withstands any forces imparted by the container 418. FIGS. 13 and 14 show perspective views of different devices 300, 400 used in combination on a single dolly 400 to provide support at the perimeter of the dolly 400. It should be understood that any combination of devices 100, 200, 300, 500 can be used on the dolly 400 as desired by the user and based on the configuration of the container 418.

The exemplary edge support devices therefore provide support at the perimeter edges of the dolly for one or more containers disposed on the supporting surface of the dolly. The type of edge support device used (or the combination of edge support devices) can be selected to accommodate the type of container(s) being used, and can be adjusted as needed by the user. The rigidity of the edge support devices ensures that the devices withstand forces imparted by the containers, while maintaining the necessary support along the perimeter of the dolly.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An edge support device for a dolly, the dolly including a supporting surface and openings in the supporting surface, the edge support device comprising:
a body including a first body section and a second body section angled relative to the first body section, each of the first and second body sections including a top surface and a bottom surface;
a first engagement assembly extending from the bottom surface of the first body section along a first plane, the first engagement assembly including a first central protrusion and a first pair of side protrusions disposed on opposing sides of the first central protrusion configured to be inserted into one of the openings of the dolly, the first pair of side protrusions spaced from the first central protrusion, the first pair of side protrusions and the first central protrusion extending perpendicularly from the bottom surface of the first body section, and a lateral width of the first central protrusion dimensioned greater than a lateral width of each of the first pair of side protrusions as measured along the first plane; and
a second engagement assembly extending from the bottom surface of the second body section along a second plane, the second engagement assembly including a second central protrusion and a second pair of side protrusions disposed on opposing sides of the second central protrusion configured to be inserted into one of the openings of the dolly, the second pair of side protrusions spaced from the second central protrusion, the second pair of side protrusions and the second central protrusion extending perpendicularly from the bottom surface of the second body section, and a lateral width of the second central protrusion dimensioned greater than a lateral width of each of the second pair of side protrusions as measured along the second plane;
wherein the first and second pairs of side protrusions of the first and second engagement assemblies engage the respective openings of the dolly to detachably couple the body to the dolly.

2. The device of claim 1, wherein the second body section is angled relative to the first body section by 90°.

3. The device of claim 1, wherein the first and second body sections angled relative to each other to define an L-shaped configuration.

4. The device of claim 1, wherein the first and second body sections extend along a first horizontal plane.

5. The device of claim 4, wherein the first and second engagement assemblies extend perpendicularly away from the first horizontal plane.

6. The device of claim 1, wherein the first engagement assembly extends parallel to the first body section in the first plane and the second engagement assembly extends parallel to the second body section in the second plane.

7. The device of claim 1, wherein the first and second central protrusions are rigid structures extending from the bottom surface of the respective first and second body sections.

8. The device of claim 1, wherein a length of the side protrusions is dimensioned greater than a length of each of the respective first and second central protrusions.

9. The device of claim 1, wherein each of the side protrusions is configured to engage with the respective openings of the dolly via a snap fit.

10. The device of claim 1, wherein each of the side protrusions includes an elongated section connected to the bottom surface of the respective first and second body sections at one end.

11. The device of claim 10, wherein each of the side protrusions includes a hook-shaped endpoint at an opposing end of the elongated section.

12. The device of claim 11, wherein the hook-shaped endpoints face away from the respective first and second central protrusions.

13. A dolly system, comprising:
a dolly including a supporting surface and openings in the supporting surface, the openings in the supporting surface including a central partial opening and two full openings on opposing sides of the central partial opening, the two full openings extending entirely through the dolly; and
an edge support device, the edge support device including:
a body including a first body section and a second body section angled relative to the first body section, each of the first and second body sections including a top surface and a bottom surface;
a first engagement assembly extending from the bottom surface of the first body section, the first engagement assembly including a first central protrusion and a first pair of side protrusions disposed on opposing sides of the first central protrusion configured to be inserted into one of the openings of the dolly; and
a second engagement assembly extending from the bottom surface of the second body section, the second engagement assembly including a second central protrusion and a second pair of side protrusions disposed on opposing sides of the second central protrusion configured to be inserted into one of the openings of the dolly;
wherein the first and second pairs of side protrusions of the first and second engagement assemblies engage the respective openings of the dolly to detachably couple the edge support device to the dolly; and
wherein during engagement of the first and second pairs of side protrusions of the first and second engagement assemblies with the respective openings of the dolly, the respective first and second central protrusions abut a bottom surface of the central partial opening and the side protrusions pass into and engage the respective two full openings.

14. The system of claim 13, wherein the second body section is angled relative to the first body section by 90°.

15. The system of claim 13, wherein the first and second body sections angled relative to each other to define an L-shaped configuration.

16. The system of claim 13, wherein the first and second central protrusions are rigid structures extending from the bottom surface of the respective first and second body sections.

17. An edge support device for a dolly, the dolly including a supporting surface and an opening in the supporting surface, the edge support device comprising:
a body including a top surface and a bottom surface; and
an engagement assembly extending from the bottom surface of the body along a plane, the engagement assembly including a central protrusion and a pair of side protrusions disposed on opposing sides of the central protrusion, the pair of side protrusions spaced from the central protrusion, the pair of side protrusions and the central protrusion extending perpendicularly from the bottom surface of the body, and a lateral width of the central protrusion dimensioned greater than a lateral width of each of the pair of side protrusions as measured along the plane;
wherein the central protrusion is a rigid structure extending from the bottom surface of the body; and
wherein the engagement assembly is configured to be inserted into and engaged with the opening of the dolly to detachably couple the body to the dolly.

* * * * *